United States Patent [19]

Beeley et al.

[11] Patent Number: 4,941,275

[45] Date of Patent: Jul. 17, 1990

[54] SNOW GROOMER VEHICLE HYDRAULIC HOSE GUIDE

[75] Inventors: Michael G. Beeley, Logan; James D. Gittins, Smithfield; William B. Sinykin, Logan, all of Utah

[73] Assignee: Logan Manufacturing Company, Logan, Utah

[21] Appl. No.: 257,279

[22] Filed: Oct. 13, 1988

[51] Int. Cl.$^5$ ............................ E01H 4/00; E01H 5/04
[52] U.S. Cl. ......................................... 37/219; 37/234; 37/236; 180/139; 414/918; 254/389
[58] Field of Search ................. 37/219, 234, 235, 236; 180/134, 139; 414/918; 138/106, 107, 110; 384/297–300; 254/389; 248/51, 52, 58, 62, 75

[56] References Cited

U.S. PATENT DOCUMENTS

| | | | |
|---|---|---|---|
| 2,640,664 | 6/1953 | Porter | 254/389 X |
| 4,111,319 | 9/1978 | Matsuyoshi et al. | 414/918 X |
| 4,241,960 | 12/1980 | Hentschel | 384/297 |
| 4,274,165 | 6/1981 | Ivko et al. | 254/389 X |
| 4,397,061 | 8/1983 | Kanzaka | 16/2 |

Primary Examiner—Edgar S. Burr
Assistant Examiner—Moshe I. Cohen
Attorney, Agent, or Firm—A. Ray Osburn

[57] ABSTRACT

A snow groomer vehicle hydraulic hose guide having a hard plastic removable insert installed within a metallic back-up ring, for use upon snow grooming vehicles and associated equipment. The insert has a very smooth surface and is shaped to provide substantial hose contact area. The guide ring substantially extends the useful life of the rubberoid hydraulic hoses widely used on such equipment.

3 Claims, 2 Drawing Sheets

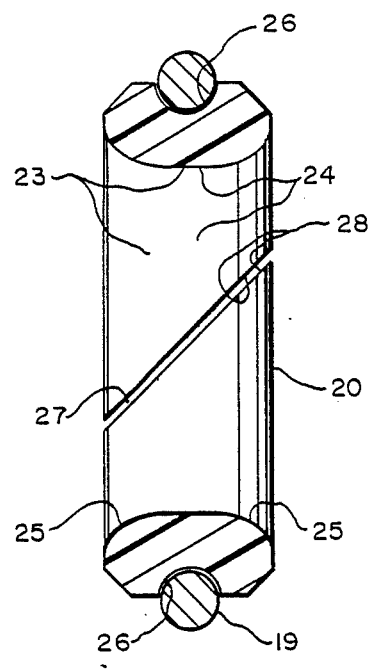
FIG. 3
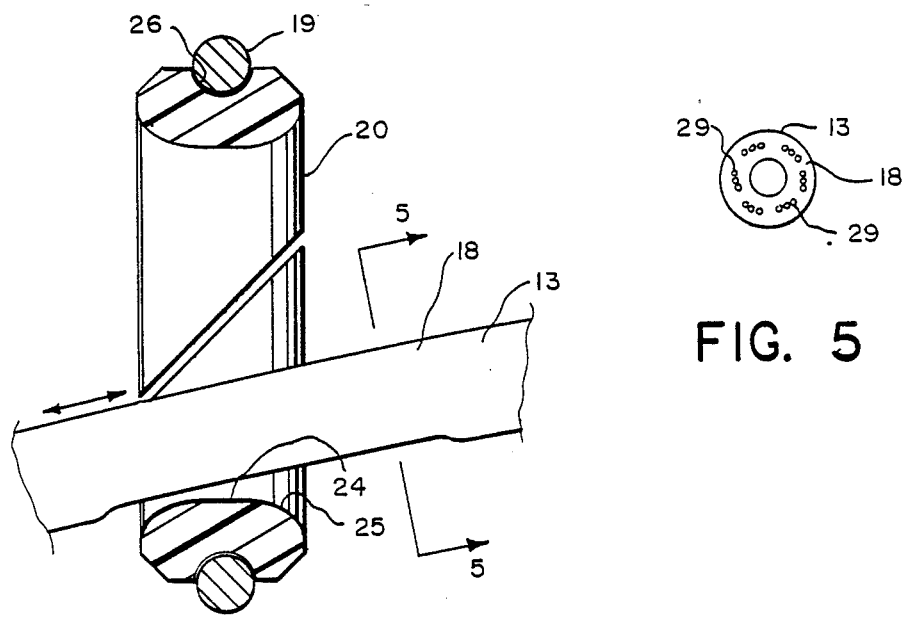
FIG. 4
FIG. 5

SNOW GROOMER VEHICLE HYDRAULIC HOSE GUIDE

BACKGROUND OF THE INVENTION

1. Field:

The invention pertains to guide devices for hydraulic hoses employed on snow grooming vehicles.

2. State of the Art:

Inserts called grommets or eyelets are commonly used in perforations through metallic bulkhead walls to protect insulated electric wires from laceration. Power cords for electric fan motors, for example, pass through the fan housings via such grommet shielded holes. The grommets are often of elastic material, and are sized to immobilize the wires by snugly gripping the exterior insulation. Metallic or plastic eyelets strengthen and protect shoe lace holes, to cite another example. Little if any relative motion occurs between tied laces and eyelets when the shoes are worn.

For snow grooming vehicles, on the other hand, guide devices must often permit back and forth motion of hydraulic hoses. This permits hydraulic actuators and the like to be mounted upon articulated moving components of the vehicle and attached equipment. Often, for example, hydraulic rams for adjusting the attitude of a snow plow blade are mounted upon a blade lift frame. The lift frame in turn is continually lifted and lowered with respect to the vehicle, causing the ram hydraulic supply hoses to slide reciprocally in guide rings. This motion causes the rubberoid sheathed hoses to be abraded by the inside of the rings, necessitating all too frequent hose replacement. The guiding forces between the ring and the serpentinely mounted hoses are often considerable, because of the high fluid pressure.

Steel rings of circular cross sections are commonly employed, providing a smoothly curving surface to reduce hose abrasion. However, snow and ice tend to adhere to the steel rings, obstructing free motion of the hoses in the rings. Rust adds to the abrasiveness of the ring, by roughening the surface and destroying the smooth, hose contacting contour. This is aggravated by granular imperfections found in steel, especially in economically acceptable formulations. To reduce ring oxidation is quite expensive. Non-oxidizing metal plating upon the rings lacks sufficient durability. Further, replating deteriorated surface rings is inconvenient and expensive, requiring removal and reinstallation after plating. Also, each plate material has its own problems. Chrome, for example tends to adhere strongly to snow. Clearly, an improved method of retaining and guiding the reciprocating hoses is needed to reduce hose abrasive damage to acceptable levels.

BRIEF SUMMARY OF THE INVENTION

With the foregoing in mind, the shortcomings and disadvantages in hydraulic hose guide devices for snow grooming vehicles and equipment are eliminated or substantially alleviated in the present invention, which provides a hose guiding member which greatly reduces abrasive damage to the hoses. To reduce hose wear, the hose guiding surface of the member is configured to provide substantial hose contact area to limit the bearing stresses upon the sheath of the hose. The insert, preferably constructed of plastic, is of material considerably more rigid than the plastic of the hose sheath. Further, the surface of the member is constructed to be smooth and free of geometric discontinuities. Preferably, the plastic members are constructed by use of molds which themselves have very smooth surfaces. Preferably, the hose guide members are made in the form of rings which can be inserted into the existing steel guide rings. The ring inserts may, if necessary, be split across to facilitate installation while still permitting the use of highly rigid plastic material.

It is therefore the principal object of the present invention to provide improved hydraulic hose guide devices for snow grooming equipment, to increase the useful life of the hoses.

BRIEF DESCRIPTION OF THE DRAWINGS

In the drawings, which represent the best mode presently contemplated for carrying out the invention.

DETAILED DESCRIPTION OF ILLUSTRATED EMBODIMENTS

Figure 1:
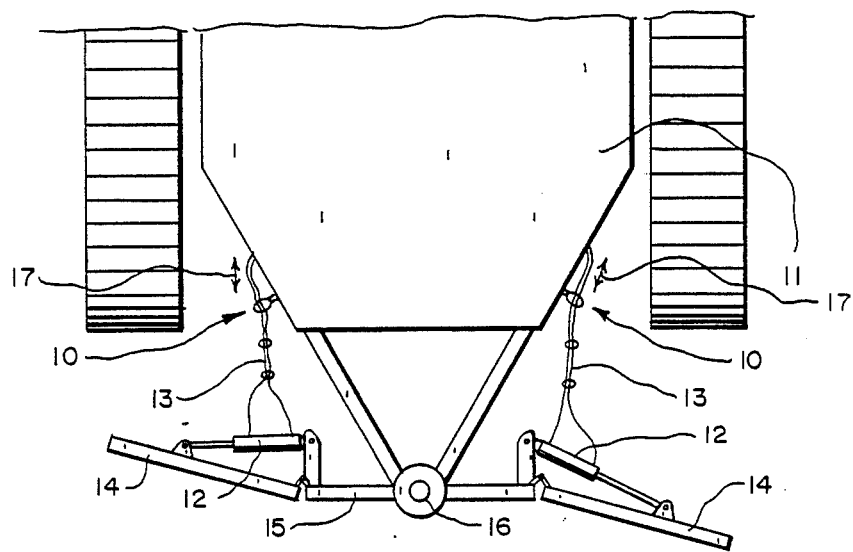
FIG. 1 is a schematic representation of a fragment of a snow grooming vehicle employing a pair of hydraulic hose guides in accordance with the invention, drawn to a reduced scale, FIG. 2 a side elevational view of one of the guide ring assemblies of FIG. 1, taken along line 2—2 thereof, drawn to substantially full scale, FIG. 3 a cross sectional view of the guide ring assembly of FIG. 2, taken along line 3—3 thereof, drawn to the same scale, FIG. 4 the guide ring of FIG. 2, showing also a segment of an abraded hydraulic hose positioned therethrough, drawn to the same scale, and FIG. 5 a cross sectional view of the abraded hose of FIG. 4, taken along line 5—5 thereof, drawn to the same scale.

A pair of hydraulic hose guide ring assemblies 10 in accordance with the invention are shown in FIG. 1, in use upon a tracked snow grooming vehicle 11. Blade wing actuator hydraulic rams 12 are supplied by hydraulic hoses 13 from a fluid supply pump, not shown, carried by vehicle 11. Rams 12 move with the blade wings 14, and also with the plow blade assembly 15, as it is rotated about pivot 16. The hoses 13 reciprocate within the ring assemblies 10 in response to these motions (arrows 17), inducing abrasive wear on their exterior sheathings 18.(FIGS. 4 & 5)

Figure 2:
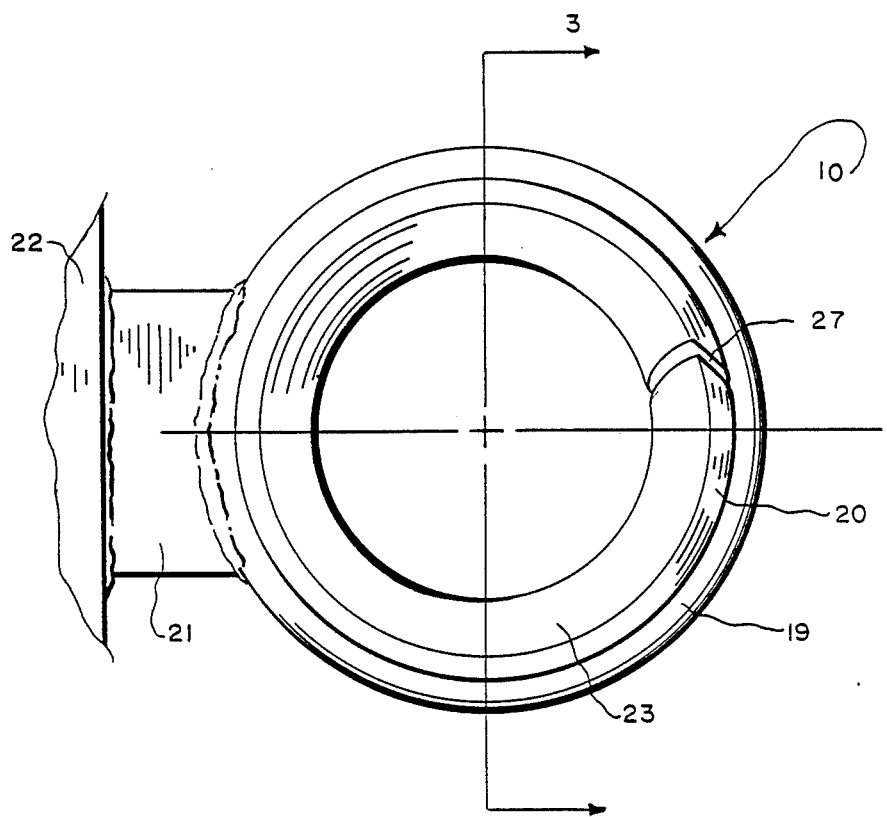

Guide ring assembly 10 comprises a ring 19 of steel rod covered by a toroidal insert 20. A mounting tab 21 is welded to ring 19, so that assembly 10 may be attached where required to vehicle 11, or the frame of plow blade 22, for example. (FIGS. 2-4)

As previously discussed, the steel rings 19 have in the past been used alone, and found to wear the hoses 13 at excessive rates. In ring assembly 10, hoses 13 are prevented from rubbing contact with metal ring 19 by the toroidal insert 20. Because of its shape, size, material properties and surface finish, insert 20 greatly reduces abrasive damage to hose sheath 18.

The inwardly facing hose contacting contour 23 of insert 20 is sized and shaped to provide substantially increased contact area with hose sheath 18, avoiding the sharply radiused contact contours previously provided by metallic ring 19. This reduces the concentrated bearing and shearing stresses on the hose, contributing to reduction of abrasive damage. (FIG. 3) Illustrated insert 20 is sized to provide a substantial central flat portion 24 and also substantial end radii 25. This provides extensive contact area for hose 13, even when it is angled sharply with ring insert 20. (FIG. 4)

Initially, it was expected that relatively soft, yielding materials would perform well for insert 20. It was reasoned that softer materials would wear away rapidly, while leaving the hose sheaths relatively undamaged. However, tests indicated the opposite results. Useable hose life increased markedly with increasing insert hardness. The hose wear tests were conducted by reciprocating hose samples against molded urethane inserts 20 of various hardnesses. Hose samples were pressed sidewise against the sample inserts with a force of 2 pounds during the test. Back and forth rubbing motions were continued until the sheaths 18 of the sample hoses were worn sufficiently to expose the underlying metal braids 29. (FIG. 5) Results are shown in Table 1.

TABLE 1

| Test No. | Insert Hardness Durometer | Cycles | Insert Condition |
|---|---|---|---|
| 1 | 60, "A" scale | 5,000 | Roughly grooved, 0.03". |
| 2 | 95, "B" scale | 8,000 | Visually and tactually roughened. |
| 3 | 70, "D" scale | 20,000 | Visually and tactually unchanged* |

*Braid 29 well covered by sheath material remaining after test.

Damage to the initially smooth surfaces of the softer inserts 20 occurred after relatively few cycles. Thereafter, greatly increased friction between hose and inserts caused the the material of both to abrade rapidly. The harder grades of plastic, short of brittleness, are therefore preferred for insert 20. Insert 20 of Test No. 3 was made of a crosslinked urethane polymer from Griffith Polymers, Inc., Hillsboro, Oreg., with a hardness of 70 on the durometer "D" scale. As indicated, it was not visually or tactually roughened or abraded even after 20,000 reciprocating motions. The rubberoid outer sheath 18 of the hoses 13 are of much softer material, having hardnesses of about 50 on the durometer "A" scale.

The surface finish of surface 23 also plays an important role in minimizing hose abrasion. Its microscopic rugosity should be as low as possible. With metals, this could be accomplished by polishing the surface to a very low rms (root mean square) value. Microscopic granular defects in metal cannot however be removed by polishing. In any event, the polished metal surface is short lived, quickly falling victim in use to corrosion and grit abrasion. The selection of plastic material eliminates corrosion damage to contoured surface 23, and such material tends to repell and shed grit. To assure the existence of a high degree of surface smoothness, a highly polished metal model of insert 20 is first constructed. Subsequently it is used to form a plastic mold for making the insert. During cure, the plastic of the mold may bridge over the small irregularities in the surface of the mold, resulting in increased smoothness even over that of the model. For the same reason, insert 20 may have a surface still more smooth than that of the mold.

Preferably, toroidal insert 20 carries a semicircular circumferential groove 26 therearound, which accepts steel ring 19 to retain the insert. Although insert 20 is quite rigid, it is preferably sufficiently resilient to permit forceable insertion into ring 19. An angled installation slit 27 is preferably provided to facilitate insertion. Slit surfaces 28 mate smoothly after installation of the insert. If desired, ring insert 20 may be positioned rotationally within ring 19 to avoid hose contact during normal use, since the hose contact is typically at particular locations on the insert.

The invention may be embodied in still other specific forms without departing from the spirit or essential characteristics thereof. The present embodiments are, therefore, to be considered as illustrative and not restrictive, the scope of the invention being indicated by the appended claims rather than by the foregoing description, and all changes that come within the meaning and range of equivalency of the claims are, therefore, intended to be embraced therein.

What is claimed and desired to be secured by United States Letters Patent is:

1. A device for use upon snow grooming equipment for guiding at least one hydraulic hose said hose having a longitudinal center line and a rubber-like outermost sheath, said device comprising:
    a member having a surface disposed for guiding the hose by contact with a side thereof, said surface being smooth, free of geometric discontinuities, and shaped to distribute hose guiding forces over a substantial portion of the outermost sheath, to prevent highly concentrated bearing forces between the member and the sheath, said guiding member being of plastic material of substantially greater hardness than that of the sheath;
    said guiding member comprising a toroidal ring with an inside surface having a diameter substantially greater than the outside diameter of the hose, the hose contact surface of said member being said inside surface thereof, said inside surface being curved transversely to the ring at opposed sides thereof so as to form curved surfaces, so as to be free of hose contacting discontinuities; wherein the hose contacting surface comprises an intermediate cylindrical portion tangentially joined with said curved surfaces at each side of the ring; the guiding member further comprising an external steel ring into which the toroidal ring is inserted and secured, said toroidal ring having an external outwardly facing circumferential groove therearound for accepting said steel ring aid steel ring having means for its connection to the equipment; the plastic guiding member being split to facilitate its insertion into the steel ring and its removal therefrom.

2. The hose guiding device of claim 1, wherein:
    the hardness of the plastic guiding member is at least 60 on the durometer "D" scale.

3. The hose guiding device of claim 1, where:
    the hose guiding member is constructed of molded urethane polymer having a hardness of 70 on the durometer "D" scale.

* * * * *